United States Patent
Cheikhzen et al.

(10) Patent No.: US 12,264,594 B1
(45) Date of Patent: Apr. 1, 2025

(54) OIL FILLER TUBE ASSEMBLY FOR AIRCRAFT ENGINE

(71) Applicant: PRATT & WHITNEY CANADA CORP., Longueuil (CA)

(72) Inventors: Ahmad Cheikhzen, Montreal (CA); Victor Sa Melo, Cambridge (CA); Michel Labbe, Montreal (CA); Penny Nicolaidis, Mont Royal (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/516,209

(22) Filed: Nov. 21, 2023

(51) Int. Cl.
*F01D 25/18* (2006.01)
*F02C 7/16* (2006.01)

(52) U.S. Cl.
CPC .............. *F01D 25/183* (2013.01); *F02C 7/16* (2013.01); *F05D 2220/323* (2013.01); *F05D 2230/72* (2013.01); *F05D 2240/58* (2013.01); *F05D 2260/608* (2013.01)

(58) Field of Classification Search
CPC ........... F01M 2011/0491; F01M 11/12; F01M 11/04; F01M 13/0405; F16N 19/003; F01D 25/183; F05D 2240/58; F05D 2230/72
USPC ....................................................... 184/6.11
See application file for complete search history.

(56) References Cited

U.S. PATENT DOCUMENTS

| | | | | |
|---|---|---|---|---|
| 2,333,711 A | * | 11/1943 | Dwiggins ................ | G01F 23/04 33/717 |
| 3,371,418 A | * | 3/1968 | Moeller .................. | G01F 23/04 215/360 |
| 3,377,708 A | * | 4/1968 | 041968 ................... | B65D 90/34 33/727 |
| 3,662,470 A | * | 5/1972 | Sasgen ..................... | G01F 23/04 33/731 |
| 3,722,102 A | * | 3/1973 | Jackson ................... | G01F 23/04 33/731 |
| 4,067,113 A | * | 1/1978 | Haines ..................... | G01F 23/04 33/727 |
| 4,155,166 A | * | 5/1979 | Rochow ................... | G01F 23/04 33/727 |
| 4,285,238 A | * | 8/1981 | Wilson .................... | G01K 13/02 374/E13.006 |
| 4,331,185 A | * | 5/1982 | Rinaldo ................... | G01F 23/04 141/285 |

(Continued)

FOREIGN PATENT DOCUMENTS

| | | |
|---|---|---|
| CN | 105781671 B | 7/2018 |
| FR | 2260783 B3 | 10/1977 |

*Primary Examiner* — Henry Y Liu

(74) *Attorney, Agent, or Firm* — NORTON ROSE FULBRIGHT CANADA LLP

(57) ABSTRACT

An oil filler assembly for an aircraft engine, has: a filler tube extending from a bottom end to a top end; a valve having a tube side fluidly connected to the filler tube and a tank side; a cap removably secured to the top end; a dipstick secured to the cap and extending into the filler tube; and a piston secured to the dipstick, the piston having: a sealing configuration in which the piston sealingly engages the filler tube to fluidly disconnect the top end from the valve, the piston being in the sealing configuration when the cap is secured to the top end of the filler tube; and a venting configuration in which the piston permits fluid communication between the top end and the valve, the piston being in the venting configuration when the cap is moved away from the top end of the filler tube.

20 Claims, 6 Drawing Sheets

(56) References Cited

U.S. PATENT DOCUMENTS

| | | | |
|---|---|---|---|
| 4,651,428 A * | 3/1987 | Allaria | B64D 37/10 33/721 |
| 4,787,528 A * | 11/1988 | Harris | B60K 15/0406 220/288 |
| 5,718,281 A * | 2/1998 | Bartalone | F01P 11/029 165/41 |
| 5,730,183 A * | 3/1998 | Kremsler | F16K 17/19 137/853 |
| 5,829,153 A * | 11/1998 | Hitchock | G01F 23/04 33/728 |
| 6,279,247 B1 * | 8/2001 | Neitzel | F16C 11/045 33/727 |
| 6,634,396 B2 * | 10/2003 | Ozawa | B67D 7/0288 141/285 |
| 6,926,121 B2 * | 8/2005 | Gates | F01M 11/12 184/88.1 |
| 7,100,744 B2 * | 9/2006 | Kettle | G01F 23/04 184/92 |
| 7,678,169 B1 * | 3/2010 | Gwin | B01D 45/06 123/41.86 |
| 7,959,026 B2 * | 6/2011 | Bertani | E04B 2/7416 215/370 |
| 8,042,705 B2 * | 10/2011 | Ligorio | F01M 11/04 220/254.1 |
| 9,182,263 B2 * | 11/2015 | Oh | G01F 23/045 |
| 9,810,565 B2 * | 11/2017 | Inokura | G01F 23/04 |
| 10,527,479 B2 * | 1/2020 | Sonnenberg | G01F 23/04 |
| 10,975,740 B2 * | 4/2021 | Daniel | F01M 11/04 |
| 11,512,636 B2 * | 11/2022 | Beaulieu | F02C 7/06 |
| 11,702,967 B2 * | 7/2023 | Bertani | F16N 19/003 220/212 |
| 11,787,601 B2 * | 10/2023 | Kulkarni | B60K 15/0406 215/200 |
| 11,859,521 B2 * | 1/2024 | Rosenberger | G01F 23/04 |
| 2008/0135553 A1 * | 6/2008 | Ligorio | G01F 23/04 220/203.23 |
| 2013/0305552 A1 * | 11/2013 | Krishnamurthy | G01F 23/04 33/728 |
| 2021/0003051 A1 * | 1/2021 | Daniel | F01M 11/04 |
| 2021/0231055 A1 * | 7/2021 | Beaulieu | F16N 23/00 |
| 2021/0246816 A1 * | 8/2021 | Rosenberger | G01F 23/04 |
| 2022/0243624 A1 * | 8/2022 | Bertani | F16N 19/003 |

* cited by examiner

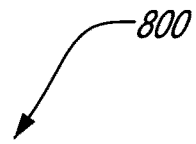

```
┌─────────────────────────────────────────────────────────────┐
│ Upon removing the cap from a top end of the filler tube,    │
│ breaking a seal defined between the piston and the filler   │──802
│ tube                                                        │
└─────────────────────────────────────────────────────────────┘
                              │
                              ▼
┌─────────────────────────────────────────────────────────────┐
│ Upon inserting the dipstick in the filler tube, increasing  │
│ a pressure in the filler tube via a sealing engagement      │──804
│ defined between the piston and the filler tube, the         │
│ pressure sufficient to open the valve                       │
└─────────────────────────────────────────────────────────────┘
```

FIG. 8

OIL FILLER TUBE ASSEMBLY FOR AIRCRAFT ENGINE

TECHNICAL FIELD

The disclosure relates generally to oil systems of aircraft engines and, more particularly, to systems and methods used for determining a level of oil in an oil tank of such engines and for filling the oil tank.

BACKGROUND

Aircraft engines, such as gas turbine engines, include an oil system for distributing an oil to required portions of the engine for lubrication and/or cooling purposes. For example, oil may be directed to and from a bearing cavity of the aircraft engine. It may be required to add some oil in an oil tank of the oil system. To do so, a filler tube may be used. The filler tube is closed off with a cap and a dipstick is secured to the cap. The dipstick is used to determine a level of oil in the oil tank. In some cases, a volume of air in the filler tube may cause a false reading on the dipstick. Improvements are therefore sought.

SUMMARY

In one aspect, there is provided an oil filler assembly for an aircraft engine, comprising: a filler tube extending from a bottom end to a top end; a valve having a tube side fluidly connected to the filler tube and a tank side fluidly connectable to an oil tank; a cap removably secured to the top end of the filler tube; a dipstick secured to the cap and extending into the filler tube towards the bottom end; and a piston secured to the dipstick and sized to be received in the filler tube between the top end and the valve, the piston having: a sealing configuration in which the piston sealingly engages the filler tube to fluidly disconnect the top end from the valve, the piston being in the sealing configuration when the cap is secured to the top end of the filler tube; and a venting configuration in which the piston permits fluid communication between the top end and the valve, the piston being in the venting configuration when the cap is moved away from the top end of the filler tube.

The oil filler assembly may include any of the following features, in any combinations.

In some embodiments, the valve includes a ball and a seat, a movement of the piston away from the top end of the filler tube and towards the valve increases a pressure inside the filler tube to unseat the ball from the seat.

In some embodiments, the piston includes a body secured to the dipstick and a seal mounted to the body, the seal movable relative to the body to move the piston between the sealing configuration and the venting configuration.

In some embodiments, the body defines an annular groove, the seal in register with the annular groove.

In some embodiments, the body has a top face facing the cap and a bottom face facing away from the cap, the body defining a vent passage extending from an inlet to an outlet, the inlet located into the annular groove, the outlet defined by the bottom face.

In some embodiments, the seal is movable within the annular groove, the seal overlapping the inlet of the vent passage in the sealing configuration of the piston, the seal offset from the inlet of the vent passage in the venting configuration of the piston.

In some embodiments, the piston includes a secondary body slidably engaged to the body, the secondary body received in the annular groove, the secondary body defining a second annular groove, the seal received in the second annular groove.

In some embodiments, the secondary body has a top face facing the top end and a bottom face opposite the top face, the secondary body defining a vent passage extending from the top face to the bottom face, the body defining a shoulder facing the top face of the secondary body, the top face of the secondary body in abutment against the shoulder and the shoulder overlapping the vent passage in the sealing configuration of the piston, the top face spaced apart from the shoulder in the venting configuration of the piston.

In some embodiments, the filler tube has a wall having a section defining a frustoconical shape, the seal being an annular elastomeric web extending from the body to a peripheral edge, the peripheral edge in abutment against the section of the wall in the sealing configuration, the peripheral edge spaced apart from the wall in the venting configuration thereby defining an air passage between the peripheral edge and the wall of the filler tube.

In another aspect, there is provided an aircraft engine, comprising: an oil tank; a filler tube; a valve between the oil tank and the filler tube, the valve operable to selectively fluidly connect the filler tube to the oil tank; a cap removably securable to a top end of the filler tube; a dipstick secured to the cap and extending into the filler tube; and a piston secured to the dipstick and sized to be received in the filler tube, the piston sealingly engaged to a wall of the filler tube and fluidly disconnecting the top end of the filler tube from the valve when the cap is secured to the top end of the filler tube, the piston permitting fluid communication between the top end of the filler tube and the valve when the cap is moved away from the top end of the filler tube.

The aircraft engine may include any of the following features, in any combinations.

In some embodiments, the valve includes a ball and a seat, a movement of the piston away from the top end of the filler tube and towards the valve increases a pressure inside the filler tube to unseat the ball from the seat thereby opening the valve to allow oil to flow from the oil tank into the filler tube.

In some embodiments, the piston includes a body secured to the dipstick and a seal mounted to the body, the seal movable relative to the body.

In some embodiments, the body defines an annular groove, the seal in register with the annular groove.

In some embodiments, the body has a top face facing the cap and a bottom face facing away from the cap, the body defining a vent passage extending from an inlet to an outlet, the inlet located into the annular groove, the outlet defined by the bottom face.

In some embodiments, the seal is movable within the annular groove, the seal overlapping the inlet of the vent passage when the cap is secured to the top end, the seal offset from the inlet of the vent passage in the cap is detached from the top end.

In some embodiments, the piston includes a secondary body slidably engaged to the body, the secondary body received in the annular groove, the secondary body defining a second annular groove, the seal received in the second annular groove.

In some embodiments, the secondary body has a top face facing the top and a bottom face opposite the top face, the secondary body defining a vent passage extending from the top face to the bottom face, the body defining a shoulder facing the top face, the top face of the secondary body in abutment against the shoulder and the shoulder overlapping the vent passage when the cap is secured to the top end, the top face spaced apart from the shoulder in when the cap is detached from the top end.

In some embodiments, the filler tube has a wall having a section defining a frustoconical shape, the seal being an annular elastomeric web extending from the body to a peripheral edge, the peripheral edge in abutment against the section of the wall when the cap is secured to the top end, the peripheral edge spaced apart from the wall when the cap is detached from the top end thereby defining an air passage between the peripheral edge and the wall of the filler tube.

In yet another aspect, there is provided a method for mitigating detrimental effects of air in a filler tube, the filler tube fluidly connected to an oil tank via a valve, the filler tube closable with a cap secured to a dipstick, the filler tube fluidly disconnectable from an environment with a piston secured to the dipstick, the method comprising: upon removing the cap from a top end of the filler tube, breaking a seal defined between the piston and the filler tube; and upon inserting the dipstick in the filler tube, increasing a pressure in the filler tube via a sealing engagement defined between the piston and the filler tube, the pressure sufficient to open the valve.

In some embodiments, the increasing of the pressure includes closing a vent defined by a body of the piston with a seal movable relative to the body.

DESCRIPTION OF THE DRAWINGS

Reference is now made to the accompanying figures in which:

FIG. 8 is a flowchart illustrating steps of a method for mitigating detrimental effects of air in a filler tube.

DETAILED DESCRIPTION

Figure 1:
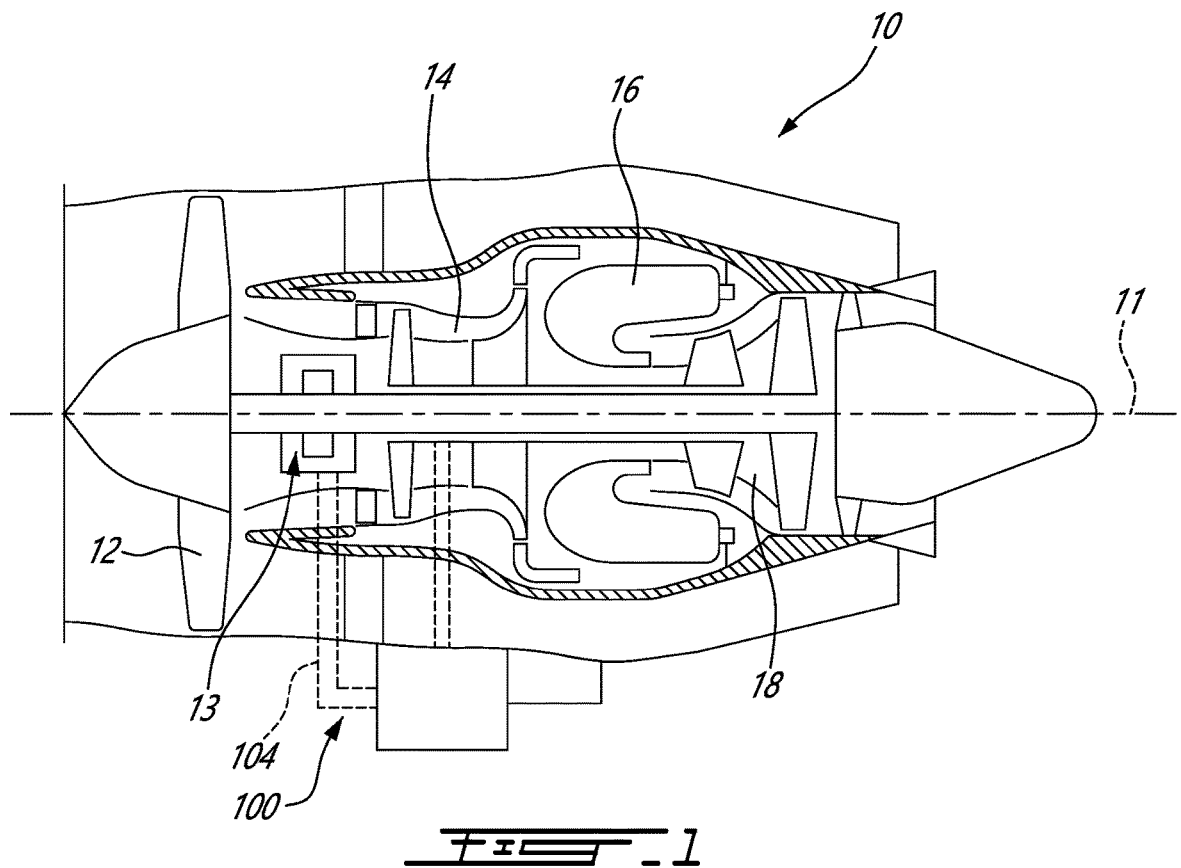
FIG. 1 is a schematic cross sectional view of an aircraft engine provided in the form of a gas turbine engine.

FIG. 1 illustrates an aircraft engine, such as a gas turbine engine 10, of a type preferably provided for use in subsonic flight. The gas turbine engine 10 includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

It will be appreciated that the principle of the present disclosure may be applied to any aircraft engines including a lubrication system or a cooling system, such as turbofan, turboprop, turboshaft, internal combustion engines, and so on.

Figure 2:
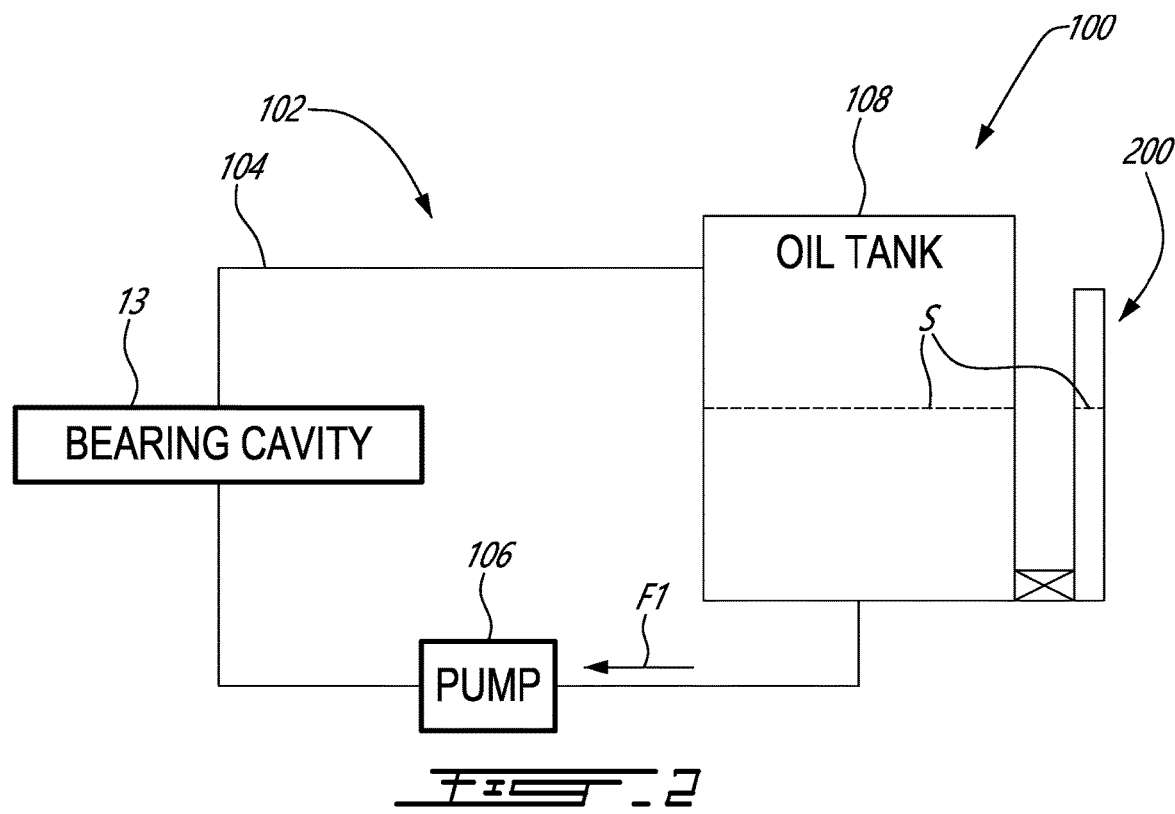
FIG. 2 is a schematic view of an oil system in accordance with one embodiment for the aircraft engine of FIG. 1.

Referring to FIGS. 1 and 2, the gas turbine engine 10 includes an oil system 100 for lubricating and/or cooling components in need of lubrication and/or cooling. These components may include, for instance, a bearing cavity 13 of the gas turbine engine 10, gearboxes, and so on. The bearing cavity 13 may include a plurality of bearing cavities for the different bearings of the gas turbine engine 10. The bearing cavity 13 is an enclosure surrounding a shaft (e.g., high-pressure shaft, low-pressure shaft) of the gas turbine engine 10 and containing one or more bearing(s). The bearing cavity 13 is supplied with a flow of oil F1 during operation to maintain proper lubricating conditions for the bearings. Used oil is scavenged out of the bearing cavity 13 and returned back to a reservoir.

In the embodiment shown, the oil system 100 includes an oil circuit 102 including conduits 104 for flowing the oil. A pump 106 is used for driving the flow of the oil F1 in the oil circuit 102. The oil system 100 includes an oil tank 108 that contains a volume of the oil. The oil system 100 is operable to draw oil from the oil tank 108 and to flow this oil within the conduits 104 to distribute the oil into the different components requiring oil. Oil is scavenged and flown back to the oil tank 108. The oil system 100 may also include additional components such as valve(s), heat exchangers, filters, scavenged pump(s), etc.

In some cases, it may be required to verify a level of oil in the oil tank 108. To do so, a filler tube assembly 200 may be used. The filler tube assembly 200 is fluidly connected to the oil tank 108 at or proximate a bottom of the oil tank 108. Therefore, the filler tube assembly 200 and the oil tank 108 may define a U-shape structure. Hence, the level of oil in the oil tank 108, denoted by line S in FIG. 2, may be the same in the oil tank 108 as in the filler tube assembly 200. As known in the art, the filler tube assembly 200 may include a dipstick that defines markings indicating if the level of oil is adequate, or if more oil is to be added in the oil tank 108.

Figure 3:
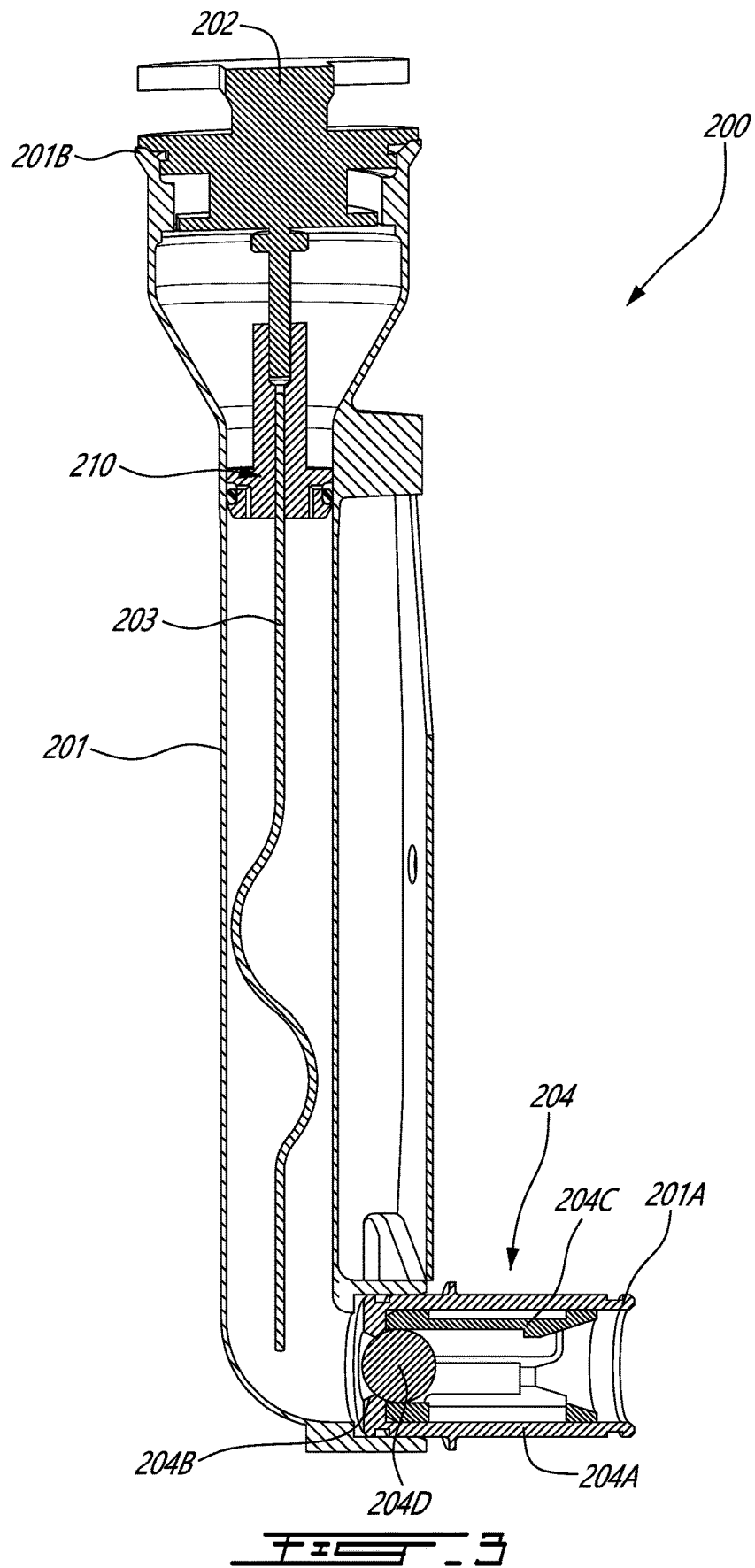
FIG. 3 is a cutaway view of a filler tube assembly in accordance with one embodiment for the oil system of FIG. 2.

Referring now to FIG. 3, the filler tube assembly 200 is described in more detail. The filler tube assembly 200 includes a filler tube 201 extending from a bottom end 201A to a top end 201B. The bottom end 201A is fluidly connected to the oil tank 108 as shown in FIG. 2. The top end 201B of the filler tube assembly 200 is selectively open or close by a cap 202. The top end 201B defines an inlet of the oil tank 108 as it is via this port that oil may be added to the oil tank 108 in some embodiments. The cap 202 is used to close the top end 201B of the filler tube assembly 200 to avoid oil leaking out of the filler tube assembly 200 during flight. The cap 202 is therefore removably securable to the top end 201B. Any suitable mechanism, such as bayonet, threads, and so on may be used to removably secure the cap 202 to the filler tube 201.

The filler tube assembly 200 includes a dipstick 203 secured to the cap 202 and extending into the filler tube 201 towards the bottom end 201A. The dipstick 203 is received within the filler tube 201 and has a length sufficient to be at least partially submerged in oil contained in the filler tube 201. The dipstick 203 may have markings on it indicating different levels of oil as known in the art.

In the embodiment shown, the filler tube assembly 200 includes a non-return valve 204 fluidly connected to the filler tube 201 proximate the bottom end 201A. The valve 204 is operable to selectively fluidly connect the filler tube 201 to the oil tank 108. The valve 204 has a tube side fluidly connected to the filler tube 201 and a tank side fluidly connected to the oil tank 108.

More specifically, the valve 204 is used as a safety feature to keep the oil in the oil tank 108 during manoeuvre of the aircraft (e.g., pitch, roll, etc). Put differently, the purpose of this valve 204 is to protect loss of oil from the oil tank during flight if by inadvertence the cap was forgotten during oil replenishment. The valve 204 is depicted as a ball valve, but any other suitable valve may be used. The valve 204 includes a conduit 204A that extends from a seat 204B to a stopper 204C. A ball 204D is movably received within the conduit 204A between the seat 204B and the stopper 204C. The stopper 204C is closer to the bottom end 201A of the filler tube 201 than the seat 204B. The valve 204 is configured such that, if the aircraft makes a manoeuvre that causes oil to flow in the filler tube 201, the oil will push the ball 204D against the seat 204B thereby preventing oil from overflowing in the filler tube 201 and escaping to the environment if the cap is missing. The stopper 204C is used to prevent the ball 204D from leaving the conduit 204A.

It has been observed by the inventors of the present disclosure that, in some cases, a volume of air trapped inside the filler tube 201 between the cap 202 and the oil expands when an altitude of the aircraft is increasing since atmospheric pressure is decreasing. The air, which now takes more space, pushes on the oil that leaves the filler tube 201 to flow into the oil tank 108 through the valve 204 by unseating the ball 204D from the seat 204B. Then, when the aircraft is back on the ground, there is a discrepancy between the level of oil in the oil tank 108 and the level of oil in the filler tube 201. It has been observed, that the greater height of oil in the oil tank 108 biases the ball 204D against the seat 204B thereby preventing oil from equilibrating between the filler tube 201 and the oil tank 108. In turn, this causes false reading of the oil level on the dipstick 203. Indeed, the dipstick 203 might indicate that there is not enough oil in the oil tank 108 while this may not actually be the case. Also, in some cases, it may cause difficulties during oil replenishment since the ball may get stuck closed and oil cannot flow to the oil tank. The filler tube assembly 200 of the present disclosure may at least partially alleviate these drawbacks.

Still referring to FIG. 3, in the embodiment shown, the filler tube assembly 200 includes a piston 210 secured to the dipstick 203. The piston 210 may be directly secured to the dipstick 203 as shown in FIG. 3 or, alternatively, secured to the dipstick 203 via the cap 202 for instance. The piston 210 is received in the filler tube 201 between the top end 201B of the filler tube 201 and the valve 204 and is operable to sealingly engage a wall of the filler tube 201 as will be explained below.

Figure 4A:
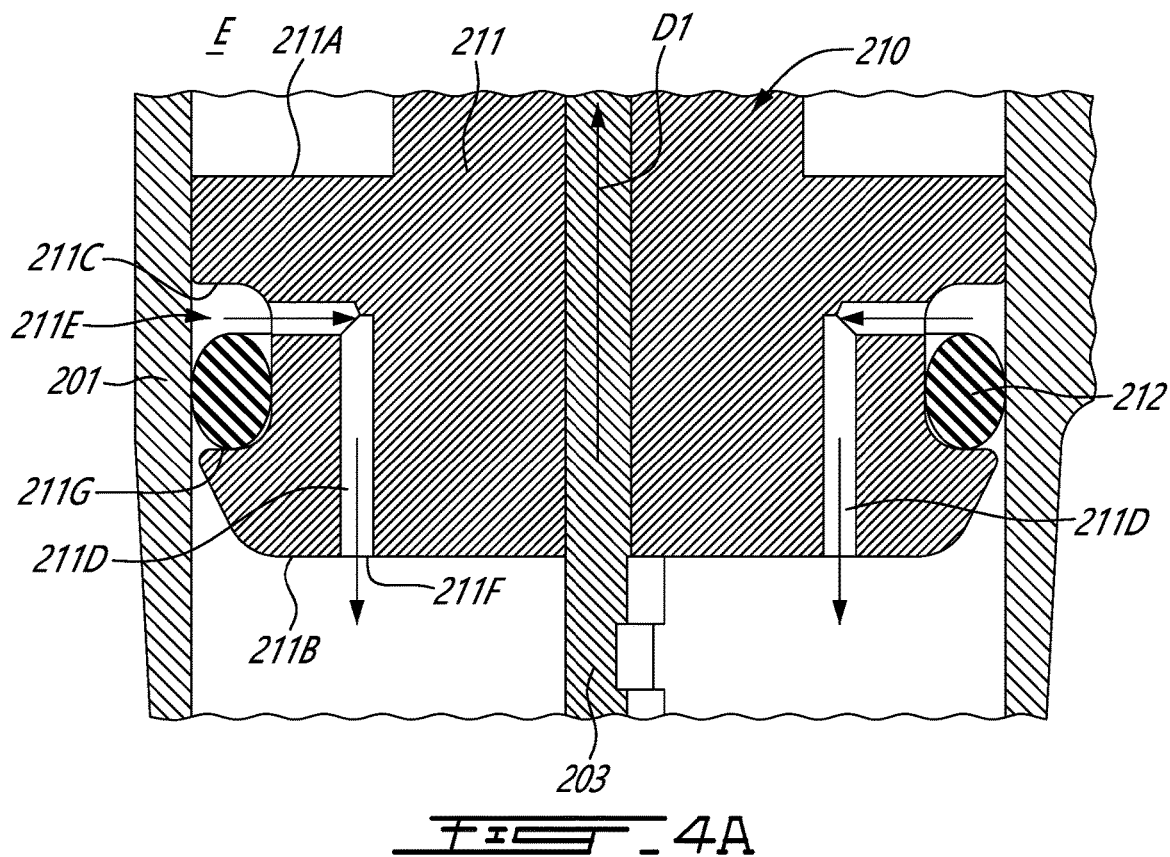
FIG. 4A is an enlarged view of a portion of the filler tube assembly of FIG. 3 in a venting configuration.
Figure 4B:
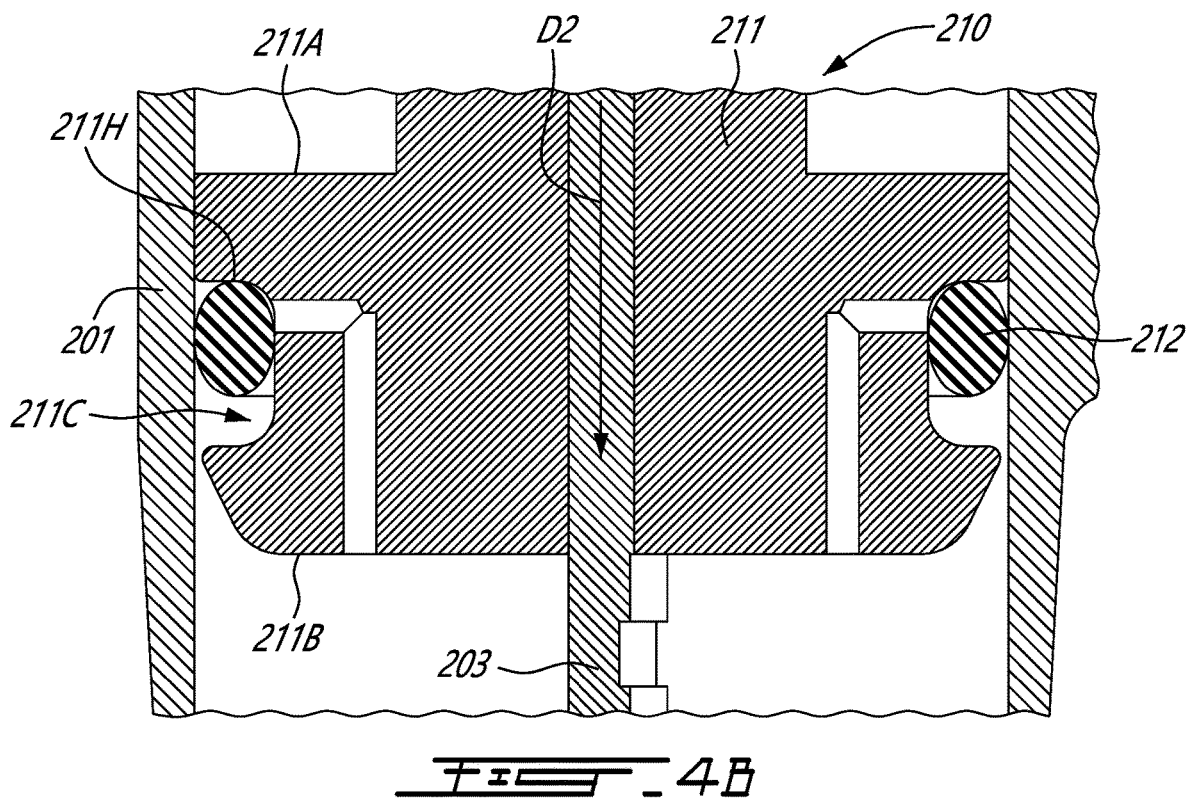
FIG. 4B is an enlarged view of a portion of the filler tube assembly of FIG. 3 in a sealing configuration.

Referring to FIGS. 4A and 4B, the piston 210 has a venting configuration (FIG. 4A) in which the piston 210 permits fluid communication between the top end 201B of the filler tube 201 and the valve 204, and has a sealing configuration (FIG. 4B) in which the piston 210 sealingly engages the filler tube 201 to fluidly disconnect the top end 201B of the filler tube 201 from the valve 204. The piston 210 is in the venting configuration when the cap 202 is moved away from the top end 201B of the filler tube, and is in the sealing configuration when the cap 202 is moved towards the top end 201B of the filler tube 201. Put differently, the piston 210 is sealingly engaged to a wall of the filler tube 201 and fluidly disconnects the top end 201B of the filler tube 201 from the valve 204 when the cap 202 is secured to the top end 201B of the filler tube 201. The piston 210 permits fluid communication between the top end 201B of the filler tube 201 and the valve 204 when the cap 202 is detached from the top end 201B of the filler tube 201 and spaced apart therefrom.

Therefore, a movement of the piston 210 away from the top end 201B of the filler tube 201 and towards the bottom end 201A of the filler tube 201, such as when inserting the dipstick 203 for closing the top end 201B with the cap 202, increases a pressure inside the filler tube 201. The increasing air pressure pushes on the ball 204D to unseat the ball 204D from the seat 204B thereby opening the valve 204 to allow a portion of the oil to flow from the oil tank 108 into the filler tube 201. This may therefore alleviate the effects of the volume of air in the filler tube 201 expanding with a decrease of atmospheric pressure. At some point, the oil pressure on opposite sides of the ball 204D may equilibrate such that the ball 204D is "floating" between the seat and the stopper. By "floating" it is implied that the ball 204D is not biased against any of the seat or the stopper.

Put differently, when checking the oil level with the dipstick, the ball may be dislodge from its seat, as it might be stuck in a closed position from the previously explained phenomenon (differential pressure at altitude, air expansion, and so on). Therefore, this may allow proper oil level check by dislodging the ball and proper oil replenishment since the ball valve may not be stuck.

In the embodiment shown, the piston 210 has a body 211 secured to the dipstick 203. In the present embodiment, the body 211 may be annular and the dipstick 203 extend through a bore defined through the body 211. Other configurations are contemplated. In the depicted embodiment, the body 211 has a top face 211A facing the cap 202 and a bottom face 211B facing away from the cap 202. The body 211 defines an annular groove 211C, which is defined by a peripheral face of the body 211. The annular groove 211C is located between the top face 211A and the bottom face 211B. The piston 210 further includes a seal 212 that is received into the annular groove 211C. The seal 212 may be, for instance, an O-ring or any suitable sealing member and may be made of an elastomeric material. The seal 212 is in register with the annular groove 211C and compressed between a wall of the filler tube 201 and the body 211 of the piston.

The body 211 further defines a vent passage 211D, or simply vent, two vent passages in the embodiment shown, but more or less may be used. The vent passages 211D have inlets 211E communicating with the annular groove 211C and outlets 211F defined by the bottom face 211B. The inlets 211E are opening to the annular groove 211C. In other words, the inlets 211E are in register with the annular groove 211C.

The seal 212 is smaller than the annular groove 211C to allow the seal 212 to move relative to the body 211. Movements of the seal 212 relative to the body 211 moves the piston 210 between the sealing configuration and the venting configuration. More specifically, and as shown in FIG. 4A, when a user separates the cap 202 from the top end 201B of the filler tube 201, the dipstick 203 and the piston 210 are pulled in an upward direction D1 to pull the dipstick 203 out of the filler tube 201 to allow the user to read the oil level. Because of a frictional engagement between the seal 212 and the wall of the filler tube 201, the seal 212 stays substantially immobile until it is abutted by a lower shoulder 211G that axially delimits the annular groove 211C. This relative movement between the seal 212 and the body 211 creates an offset between the seal 212 and the inlets 211E of the vent passages 211D. In other words, the seal 212 is offset from the inlets 211E of the vent passages 211D in the venting configuration of the piston 210. Therefore, an environment E outside the filler tube 201 is fluidly connected to a volume located between the piston 210 and the valve 204 through the vent passages 211D. This therefore permits air to flow from the environment E into this volume thereby preventing a suctioning effect that might pull oil out of the oil tank 108 into the filler tube 201 and which might cause false reading of the oil level.

As shown in FIG. 4B, when the dipstick 203 and the cap 202 are reinstalled, the piston 210 is inserted into the filler tube 201 and moved along a downward direction D2 opposite the upward direction D1. The frictional engagement between the seal 212 and the wall of the filler tube 201 opposes movements of the seal 212 to cause a relative movement between the seal 212 and the body 211 of the piston 210 until the seal 212 is abutted by an upper shoulder 211H located above the annular groove 211C. This relative movement causes the seal 212 to become in register with the inlets 211E of the vent passages 211D such that the seal 212 overlaps the inlets 211E to close the vent passages 211D. Hence, the seal 212 overlaps the inlets 211E of the vent passages 211D in the sealing configuration of the piston 210.

Therefore, as explained above, once the seal 212 closes the vent passages 211D, the volume of air between the piston 210 and the valve 204 is fluidly disconnected from the environment E outside the filler tube 201 and further motion of the piston 210 along the downwards direction D2 compresses air located in this volume to unseat the ball 204D of the valve 204 from the seat 204B (FIG. 3) to permit a volume of oil to leave the oil tank 108 and enters the filler tube 201. The drawbacks caused by the air in the volume may thus be at least partially avoided.

Figure 5:
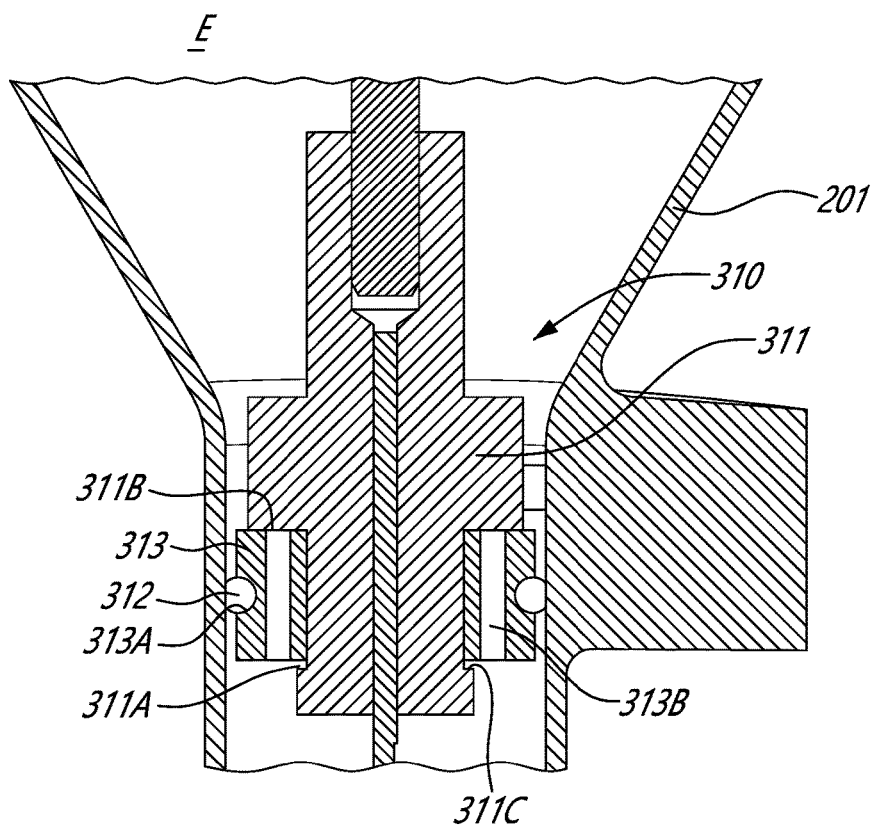
FIG. 5 is an enlarged view of another embodiment of a piston for the filler tube assembly of FIG. 3 shown in a sealing configuration.

Referring now to FIG. 5, another embodiment of a piston is shown at 310. The piston 310 includes a body 311 and a secondary body 313 disposed around the body 311 and slidably engaged to the body 311. The secondary body 313 is received within an annular groove 311A defined by the body 311. The secondary body 313 is movable relative to the body 311 within the annular groove 311A and between a top shoulder 311B and a bottom shoulder 311C. The top shoulder 311B faces downwardly away from the cap 202 (FIG. 3). The secondary body 313 defines an annular groove 313A that receives the seal 312, which is compressed between the wall of the filler tube 201 and the secondary body 313.

The secondary body 313 defines vent passages 313B, two shown but more or less may be used, that extend from a top face to a bottom face of the secondary body 313. Inlets of the vent passages 313B are facing the top shoulder 311B and are radially overlapped by the top shoulder 311B. In the sealing configuration of the piston 310 depicted in FIG. 5, the top face of the secondary body 313 is in abutment against the top shoulder 311B and the top shoulder 311B overlaps the vent passages 313B thereby fluidly disconnecting the environment E from the volume of air located below the piston 310. In some embodiments, a sealing surface with a sealing feature (e.g., gasket) may be included. When pulling the piston 310 out of the filler tube 201, as explained above, the seal 312 opposes this movement thereby creating a space between the top shoulder 311B and the secondary body 313 to open the vent passages 313B thereby fluidly connecting the environment E to the volume. This may prevent the suctioning effect as discussed above. Hence, in the venting configuration of the piston 310, the top face of the secondary body 313 is spaced apart from the top shoulder 311B. It will be appreciated that the bottom shoulder 311C is dimensioned to not overlap the vent passages 313B.

Figure 6:
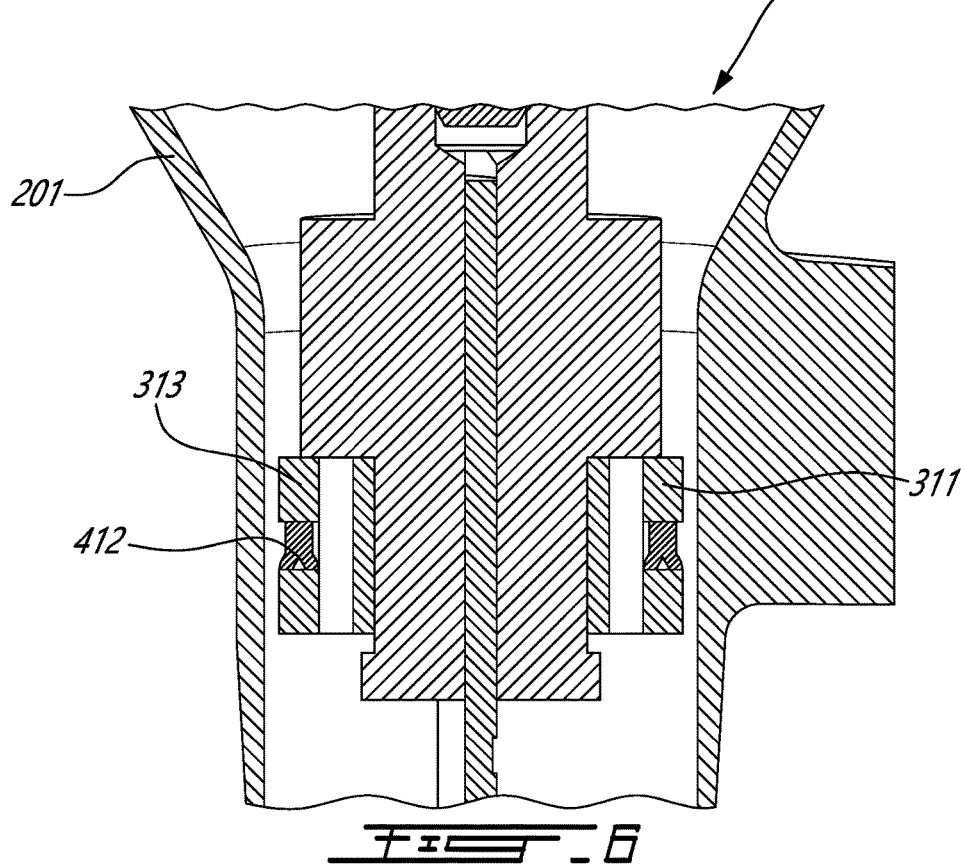
FIG. 6 is a cutaway view of a variant of the filler tube assembly of FIG. 5.

As shown in FIG. 5, the seal 312 may be an O-ring. As shown in FIG. 6, the seal 412 may be a V-cup seal. The V-cup seal may define two legs spaced apart by a gap. The two legs oriented downwardly such that when pushing the piston 310 into the filler tube 201, the two legs tend to separate from one another to increase a sealing effect with the filler tube 201. When pulling the piston 310 out of the filler tube 201, the two legs may move toward one another to decrease the sealing effect to facilitate the removal of the piston 310.

Figure 7A:
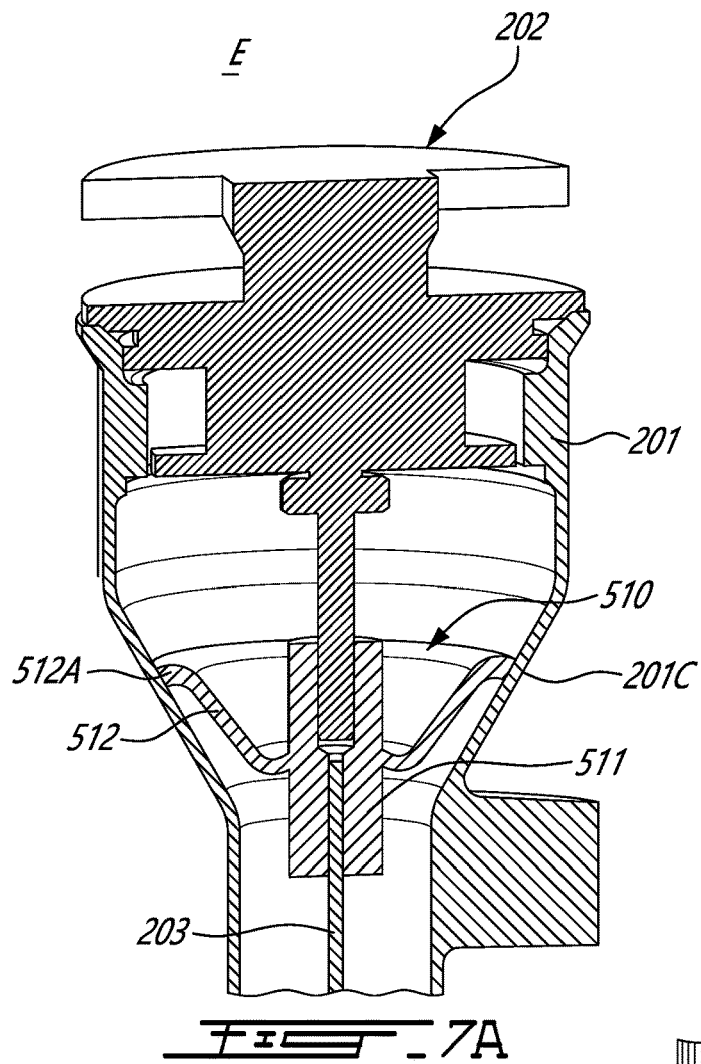
FIG. 7A is a cutaway view of a filler tube assembly in accordance with yet another embodiment for the oil system of FIG. 2, the filler tube assembly shown in a sealing configuration.

Referring now to FIGS. 7A, another embodiment of a piston is shown at 510. The piston 510 includes a body 511 and a seal 512 mounted to the body 511. In this embodiment, the piston 510 and the seal 512 are two parts of a single monolithic member, which may be made of an elastomeric material. These two parts may alternatively be secured together via any suitable means. The seal 512 is located within a frustoconical section 201C of the filler tube 201. The seal 512 may be regarded as an annular elastomeric web extending from the body 511 to a peripheral edge 512A. The peripheral edge 512A abuts the frustoconical section 201C of the wall in the sealing configuration.

Figure 7B:
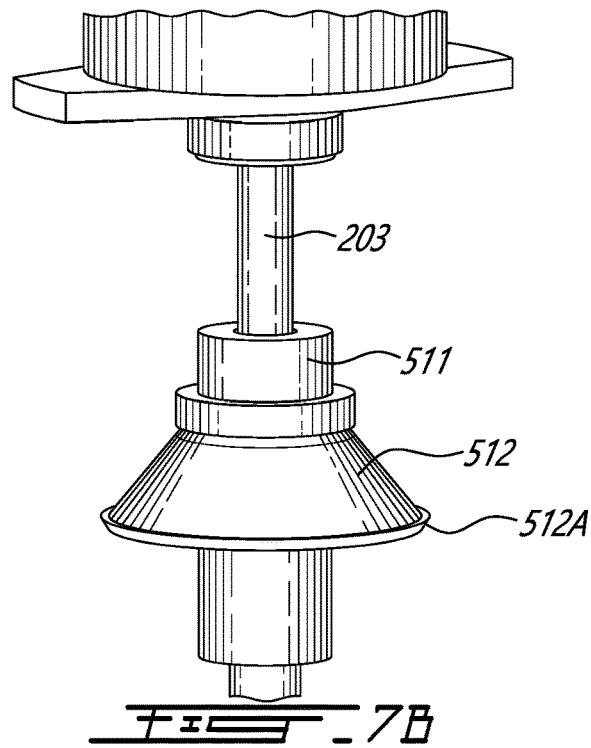
FIG. 7B is a three dimensional view of a piston of the filler tube assembly of FIG. 8A.

When removing the cap 202 and pulling on the piston 510, the peripheral edge 512A eventually becomes in register with a portion of the frustoconical section 201C of the filler tube 201 that has a greater diameter and the peripheral edge 512A no longer contacts the wall of the filler tube 201. This creates a gap between the peripheral edge 512A and the filler tube 201 to fluidly connect the environment E to the volume below the piston 510. At some point, the web of the seal 512 may invert as shown in FIG. 7B. When re-inserting the dipstick 203 and the piston 510, the peripheral edge 512A may abut the frustoconical section 201C of the filler tube 201 to fluidly disconnect the environment E from the volume below the piston 510. Further downward motion of the piston 510 pushes on the air to open the valve 204 as described herein above. Therefore, in this embodiment, the peripheral edge 512A is spaced apart from the wall in the venting configuration thereby defining an air passage between the peripheral edge 512A and the wall of the filler tube 201. The peripheral edge 512A is in abutment against the wall of the filler tube 201 in the sealing configuration.

Referring to FIG. 8, a method for mitigating detrimental effects of air in the filler tube 201 is shown at 800. The method 800 includes upon removing the cap 202 from the top end 201B of the filler tube 201, breaking a seal defined between the piston 210, 310, 510 and the filler tube 201 thereby preventing a suction of oil from the oil tank 108 into the filler tube 201 at 802; and upon inserting the dipstick 203 in the filler tube 201, increasing a pressure in the filler tube 201 via a sealing engagement defined between the piston 210, 310, 510 and the filler tube 201 thereby opening the valve 204 to allow a portion of the oil to flow from the oil tank 108 and into the filler tube 201 at 804. The pressure is sufficient to open the valve 204.

In some embodiments, the increasing of the pressure at 804 includes closing the vents defined by the body of the piston 210, 310, 510 with the seal 212, 312, 412, 512 movable relative to the body 211, 311, 511.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

In the context of the present disclosure, the expressions "top" and "bottom" are in relation to an elevation from a ground when an aircraft equipped with the gas turbine engine 10 is on the ground.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An oil filler assembly for an aircraft engine, comprising:
   a filler tube extending from a bottom end to a top end;
   a valve having a tube side fluidly connected to the filler tube and a tank side fluidly connectable to an oil tank;
   a cap removably secured to the top end of the filler tube;
   a dipstick secured to the cap and extending into the filler tube towards the bottom end; and
   a piston secured to the dipstick and sized to be received in the filler tube between the top end and the valve, the piston having:
      a sealing configuration in which the piston sealingly engages the filler tube to fluidly disconnect the top end from the valve, the piston being in the sealing configuration when the cap is secured to the top end of the filler tube; and
      a venting configuration in which the piston permits fluid communication between the top end and the valve, the piston being in the venting configuration when the cap is moved away from the top end of the filler tube.

2. The oil filler assembly of claim 1, wherein the valve includes a ball and a seat, a movement of the piston away from the top end of the filler tube and towards the valve increases a pressure inside the filler tube to unseat the ball from the seat.

3. The oil filler assembly of claim 1, wherein the piston includes a body secured to the dipstick and a seal mounted to the body, the seal movable relative to the body to move the piston between the sealing configuration and the venting configuration.

4. The oil filler assembly of claim 3, wherein the body defines an annular groove, the seal in register with the annular groove.

5. The oil filler assembly of claim 4, wherein the body has a top face facing the cap and a bottom face facing away from the cap, the body defining a vent passage extending from an inlet to an outlet, the inlet located into the annular groove, the outlet defined by the bottom face.

6. The oil filler assembly of claim 5, wherein the seal is movable within the annular groove, the seal overlapping the inlet of the vent passage in the sealing configuration of the piston, the seal offset from the inlet of the vent passage in the venting configuration of the piston.

7. The oil filler assembly of claim 4, wherein the piston includes a secondary body slidably engaged to the body, the secondary body received in the annular groove, the secondary body defining a second annular groove, the seal received in the second annular groove.

8. The oil filler assembly of claim 7 wherein the secondary body has a top face facing the top end and a bottom face opposite the top face, the secondary body defining a vent passage extending from the top face to the bottom face, the body defining a shoulder facing the top face of the secondary body, the top face of the secondary body in abutment against the shoulder and the shoulder overlapping the vent passage in the sealing configuration of the piston, the top face spaced apart from the shoulder in the venting configuration of the piston.

9. The oil filler assembly of claim 3, wherein the filler tube has a wall having a section defining a frustoconical shape, the seal being an annular elastomeric web extending from the body to a peripheral edge, the peripheral edge in abutment against the section of the wall in the sealing configuration, the peripheral edge spaced apart from the wall in the venting configuration thereby defining an air passage between the peripheral edge and the wall of the filler tube.

10. An aircraft engine, comprising:
an oil tank;
a filler tube;
a valve between the oil tank and the filler tube, the valve operable to selectively fluidly connect the filler tube to the oil tank;
a cap removably securable to a top end of the filler tube;
a dipstick secured to the cap and extending into the filler tube; and
a piston secured to the dipstick and sized to be received in the filler tube, the piston sealingly engaged to a wall of the filler tube and fluidly disconnecting the top end of the filler tube from the valve when the cap is secured to the top end of the filler tube, the piston permitting fluid communication between the top end of the filler tube and the valve when the cap is moved away from the top end of the filler tube.

11. The aircraft engine of claim 10, wherein the valve includes a ball and a seat, a movement of the piston away from the top end of the filler tube and towards the valve increases a pressure inside the filler tube to unseat the ball from the seat thereby opening the valve to allow oil to flow from the oil tank into the filler tube.

12. The aircraft engine of claim 10, wherein the piston includes a body secured to the dipstick and a seal mounted to the body, the seal movable relative to the body.

13. The aircraft engine of claim 12, wherein the body defines an annular groove, the seal in register with the annular groove.

14. The aircraft engine of claim 13, wherein the body has a top face facing the cap and a bottom face facing away from the cap, the body defining a vent passage extending from an inlet to an outlet, the inlet located into the annular groove, the outlet defined by the bottom face.

15. The aircraft engine of claim 14, wherein the seal is movable within the annular groove, the seal overlapping the inlet of the vent passage when the cap is secured to the top end, the seal offset from the inlet of the vent passage in the cap is detached from the top end.

16. The oil aircraft engine of claim 13, wherein the piston includes a secondary body slidably engaged to the body, the secondary body received in the annular groove, the secondary body defining a second annular groove, the seal received in the second annular groove.

17. The aircraft engine of claim 16, wherein the secondary body has a top face facing the top and a bottom face opposite the top face, the secondary body defining a vent passage extending from the top face to the bottom face, the body defining a shoulder facing the top face, the top face of the secondary body in abutment against the shoulder and the shoulder overlapping the vent passage when the cap is secured to the top end, the top face spaced apart from the shoulder in when the cap is detached from the top end.

18. The aircraft engine of claim 12, wherein the filler tube has a wall having a section defining a frustoconical shape, the seal being an annular elastomeric web extending from the body to a peripheral edge, the peripheral edge in abutment against the section of the wall when the cap is secured to the top end, the peripheral edge spaced apart from the wall when the cap is detached from the top end thereby defining an air passage between the peripheral edge and the wall of the filler tube.

19. A method for mitigating detrimental effects of air in a filler tube, the filler tube fluidly connected to an oil tank via a valve, the filler tube closable with a cap secured to a dipstick, the filler tube fluidly disconnectable from an environment with a piston secured to the dipstick, the method comprising:
upon removing the cap from a top end of the filler tube, breaking a seal defined between the piston and the filler tube; and
upon inserting the dipstick in the filler tube, increasing a pressure in the filler tube via a sealing engagement defined between the piston and the filler tube, the pressure sufficient to open the valve.

20. The method of claim 19, wherein the increasing of the pressure includes closing a vent defined by a body of the piston with a seal movable relative to the body.

* * * * *